(12) United States Patent
Breau et al.

(10) Patent No.: US 8,270,954 B1
(45) Date of Patent: Sep. 18, 2012

(54) CONCIERGE FOR PORTABLE ELECTRONIC DEVICE

(75) Inventors: Jeremy R. Breau, Leawood, KS (US); Eric E. Miller, Olathe, KS (US); Sei Y. Ng, Overland Park, KS (US); Carl J. Persson, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 250 days.

(21) Appl. No.: 12/698,513

(22) Filed: Feb. 2, 2010

(51) Int. Cl.
*H04M 3/42* (2006.01)
(52) U.S. Cl. .................. 455/414.2; 704/270.1
(58) Field of Classification Search ............. 455/414.2; 704/270.1
See application file for complete search history.

(56) References Cited

U.S. PATENT DOCUMENTS

| | | | |
|---|---|---|---|
| 2006/0246874 A1* | 11/2006 | Sullivan | 455/412.1 |
| 2007/0032247 A1 | 2/2007 | Shaffer et al. | |
| 2007/0100749 A1* | 5/2007 | Bachu et al. | 705/42 |
| 2008/0037727 A1* | 2/2008 | Sivertsen et al. | 379/88.13 |
| 2008/0248797 A1* | 10/2008 | Freeman et al. | 455/425 |
| 2008/0281665 A1* | 11/2008 | Opaluch | 705/9 |
| 2010/0291972 A1* | 11/2010 | Gandhi et al. | 455/563 |

* cited by examiner

*Primary Examiner* — Wayne Cai
*Assistant Examiner* — Chuck Huynh

(57) ABSTRACT

A system is provided. The system comprises a processor, a memory, and an application stored in the memory. When executed by the processor, the application activates a concierge function in response to a first trigger, and deactivates the concierge function in response to a second trigger. While the concierge function is active, the application analyzes a first digital signal encoding voice content from the portable electronic device to identify a context and, in response to identifying the context, transmits a second digital signal encoding a voice message to be presented by the portable electronic device based on the context keyword.

6 Claims, 5 Drawing Sheets

CONCIERGE FOR PORTABLE ELECTRONIC DEVICE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Portable electronic devices, for example mobile phones, are becoming more and more powerful and capable. A variety of convenience and organization applications now execute on portable electronic devices, such as personal calendars, address books, and one or more settable alarms.

SUMMARY

In an embodiment, a system is provided. The system comprises a processor, a memory, and an application stored in the memory. When executed by the processor, the application activates a concierge function in response to a first trigger, and deactivates the concierge function in response to a second trigger. While the concierge function is active, the application analyzes a first digital signal encoding voice content from the portable electronic device to identify a context and, in response to identifying the context keyword, transmits a second digital signal encoding a voice message to be presented by the portable electronic device based on the context.

In an embodiment, another system is provided. The system comprises a processor, a memory, an application stored in the memory. When executed by the processor, the application receives calendar information from a portable electronic device. When a concierge function of the application is inactive, the application monitors a first digital signal encoding voice content from the portable electronic device to identify a first word string, wherein the first word string comprises at least one word. When the concierge function of the application is inactive and the first word string is identified in the first digital signal, the application activates the concierge function of the application. When the concierge function of the application is active, the application monitors the first digital signal to identify a second word string, wherein the second word string comprises at least one word and is different from the first word string, and when the concierge function of the application is active and the application identifies the second word string in the first digital signal, the application deactivates the concierge function of the application. While the concierge function is active, the application analyzes the first digital signal to identify a context of the voice content and, in response to identifying the voice context, transmits a second digital signal encoding a voice message to the portable electronic device based on the context and based on the calendar information.

In an embodiment a method of communicating is disclosed. The method comprises storing calendar information associated with a portable electronic device, activating a concierge function based on identifying a first word string in a voice content received from the portable electronic device, wherein the word string comprises at least one word, and deactivating the concierge function based on identifying a second word string in a voice content received from the portable electronic device, wherein the second word string comprises at least one word. While the concierge function is active, the method further comprises detecting a call origination to a communication device and, based on an association of the communication device to the stored calendar information, transmitting a first voice message to the portable electronic device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
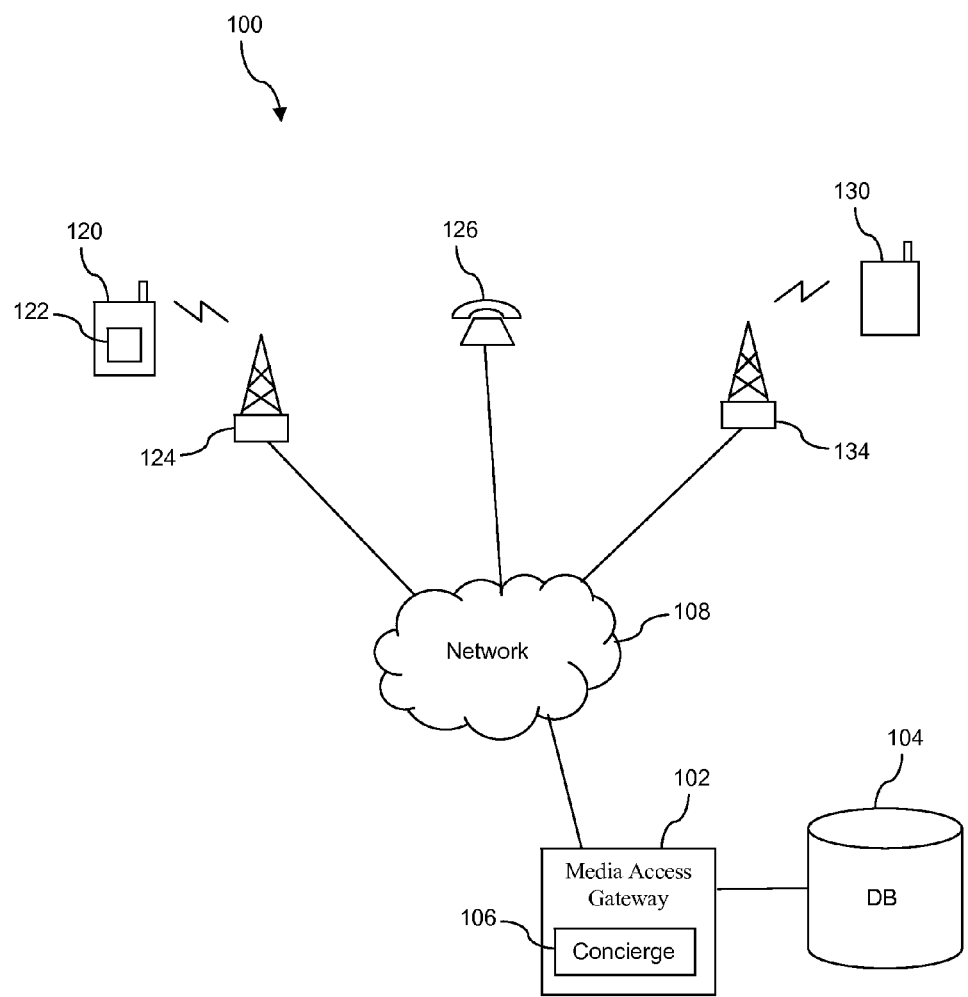
FIG. 1 is an illustration of a system according to an embodiment of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

The present disclosure teaches a concierge function for a portable electronic device. The concierge function may operate in an inactive mode and in an active mode. In the inactive mode, the concierge function may monitor voice content transmitted by the portable electronic device for a first word string, and when the concierge function detects the first word string, the concierge function enters the active mode. The first word string, for example, may comprise the words "concierge on" or some like short string of words spoken by the user of the portable electronic device. Alternatively, in the inactive mode, the concierge function may enter the active mode in response to receiving a first message from the portable electronic device. In the active mode, the concierge function may monitor the voice content transmitted by the portable electronic device for a second word string, and when the concierge function detects the second word string, the concierge function enters the inactive mode. The second word string, for example, may comprise the words "concierge off" or some like short string of words spoken by the user of the portable electronic device. Alternatively, in the active mode, the concierge function may enter the inactive mode in response to a second message from the portable electronic device. It is understood that the voice content transmitted by the portable electronic device may be in a digitized and/or encoded form, and that the concierge application may process the voice content either in the digitized form, the encoded form, or in an analog form.

While in the inactive state, the burden on the concierge function of monitoring the voice content transmitted by the portable electronic device may be reduced due to the limited vocabulary that the concierge function needs to respond to. This may be referred to in some contexts as delimiting the monitoring of a voice stream. While in the active state, the concierge function monitors the voice content transmitted by the portable electronic device to identify keywords and to identify a context of the voice content transmitted by the portable electronic device. In an embodiment, the concierge function may monitor only the voice content transmitted by the portable electronic device. In another embodiment, however, when active the concierge function may further monitor a voice content transmitted by a communication device with which the portable electronic device is connected in a voice call. Based on having identified a context associated with a call between the portable electronic device and the communication device, the concierge may take a variety of actions. If the context is a discussion about plans to eat at a restaurant, the concierge may transmit a voice message recommending a restaurant and/or providing directions to the restaurant to be heard by the portable electronic device and optionally by the communication device with which the portable electronic device is connected in a voice call. If the context is a discussion about entertainment plans, the concierge may consult a calendar, determine an available time, and transmit a voice message recommending a movie. Additionally, the concierge may further purchase the tickets in the name of the user of the portable electronic device. The present disclosure contemplates a variety of other capabilities of the concierge function which are discussed further hereinafter.

The concierge function may be implemented by an application executing on a computer system in a wireless communication network, for example an application executing on a media access gateway or another server computer. Alternatively, in an embodiment, the concierge function may be implemented by an application executing on the portable electronic device. Alternatively, some aspects of the concierge function may be implemented on a computer system in the wireless communication network, and other aspects may be implemented by an application executing on the portable electronic device. For example, an application executing on the mobile device may monitor for the first word string and on the event of detecting the first word string, send a message to the media access gateway to activate the concierge application executing on the media access gateway.

Turning now to FIG. 1, a system 100 is described. In an embodiment, the system 100 comprises a media access gateway 102 coupled to a data store 104. The media access gateway 102 executes a concierge application 106 that provides a variety of concierge-type functions to a first portable electronic device 120, for example a mobile phone. In an embodiment, the first portable electronic device 120 may execute a concierge client application 122. The media access gateway 102 communicates via a network 108 that may comprise a public network, a private network, or combinations thereof. Portions of the network 108 may comprise the Internet. The media access gateway 102 may be implemented as a computer. Computers are described in greater detail hereinafter.

While in the following the concierge application 106 is described as executing on the media access gateway 102, it is understood that the concierge application 106 may execute on other platforms. In an alternative embodiment, the concierge application 106 may execute on some computer and/or server other than the media access gateway 102. In yet another embodiment, the concierge application 106 may execute on the first portable electronic device 120 and may replace or supplement the concierge client application 122. There are different advantages and disadvantages that flow from executing the concierge application 106 on any of the media access gateway 102, a server computer, or the first portable electronic device 120. In combination with the present disclosure, one skilled in the art can readily decide on which platform to execute the concierge application 106 to best achieve a specific set of business objectives in a specific communication operating environment.

A first base transceiver station 124 provides a wireless communication link to the first portable electronic device 120, whereby the first portable electronic device 120 is coupled to the network 108 and has connectivity therethrough to other communication devices, for example the communication device 126, for example a plain old telephone service (POTS) phone, and the second portable electronic device 130. A second base transceiver station 134 provides a wireless communication link to the second portable electronic device 130, whereby the second portable electronic device 130 is coupled to the network 108 and has connectivity therethrough to other communication devices.

The portable electronic devices 120, 130 may be any of a mobile phone, a personal digital assistant (PDA), a media player, or other portable electronic device having wireless communication capability. While shown in communication with a single base transceiver station, the base transceiver station 124, it is understood that the first portable electronic device 120 may be in communication with more than one base transceiver station at one time. Additionally, it is understood that over time the first portable electronic device 120 may drop the wireless communication link with the first base transceiver station 124 and establish other wireless communication links with other base transceiver stations, for example in handoff operations as the first portable electronic device 120 moves. These comments apply likewise to the second portable electronic device 130 and its wireless communication links with the second base transceiver station 134 and other base transceiver stations.

The base transceiver stations 124, 134 provide wireless communication services based on one or more wireless communication protocols such as code division multiple access (CDMA), global system for mobile communication (GSM), long-term evolution (LTE), worldwide interoperability for microwave access (WiMAX), and/or other wireless communication protocols. In an embodiment, voice calls routing through some of the network 108 may be transported using voice over Internet Protocol (VoIP). The communication device 126 may communicate via plain old telephone service to the network 108, but the traffic from the communication device 126 may be converted to voice over Internet Protocol as it is received in the network 108 to promote more efficient transport of the voice traffic. Likewise, voice traffic directed to the communication device 126 may be transported in the network 108 using voice over Internet Protocol with the traffic converted to a plain old telephone service signal before the voice traffic is delivered to the communication device 126. Alternatively, the communication device 126 may communicate with the network 108 using voice over Internet Protocol (VoIP) technology. While only a small number of portable electronic devices 120, 130, base transceiver stations 124, 134, and communication devices 126 are illustrated in FIG. 1, it is understood that the system 100 comprises many base transceiver stations, portable electronic devices, and communication devices.

In an embodiment, the concierge application 106 may monitor voice content or voice traffic transmitted by the first portable electronic device 120. When in an inactive mode, the monitoring may be limited to only analyzing the encoded voice content to detect a first word string directed to cause the concierge application to transition to an active mode. The first word string may be referred to as a first trigger and/or as a first triggering event in some contexts. As an example, the first word string may comprise one or more words, for example "concierge on," "concierge activate," or some other suitable sequence of spoken words. In an embodiment, the first word string may be configurable by a user from the first portable electronic device 120. The analysis and/or computational burden on the concierge application 106 may be modest when only monitoring to detect the first word string, for example a word string which is constrained to a limited length and to a specific sequence of spoken words and/or sounds. The first word string may be less than 20 words in length, less than 10 words in length, or less than 5 words in length. Once active, however, the analysis and/or computation burden on the concierge application 106 becomes greater. While active, if the concierge application 106 detects a second word string, the concierge application 106 returns to the inactive mode. In some contexts, receiving the second word string may be referred to as a second trigger and/or as a second triggering event. As an example, the second word string may be "concierge off," "concierge deactivate," or some other suitable sequence of spoken words. The second word string may be less than 30 words in length, less than 25 words in length, less than 20 words in length, less than 15 words in length, less than 10 words in length, or less than 5 words in length.

In an embodiment, the concierge client application 122 may monitor the voice content before it is encoded by the first portable electronic device 120 to detect the first word string. When the concierge client application 122 detects the first word string, the concierge client application 122 may send a first message to the concierge application 106 that triggers the concierge application 106 to transition to the active mode. Similarly, the concierge client application 122 may continue to monitor the voice content before it is encoded by the first portable electronic device 120 to detect the second word string. When the concierge client application 122 detects the second word string, the concierge client application 122 may send a second message to the concierge application 106 that triggers the concierge application 106 to transition to the inactive mode. Alternatively, the concierge client application 122 may respond to a special code and/or code sequence input using a keypad or touch screen of the first portable electronic device 120 to send the first message to the concierge application 106. Distributing the responsibility for monitoring for the first word string to activate the concierge application 106 and for monitoring for the second word string to deactivate the concierge application 106 may reduce the processing burden on the concierge application 106 and/or the media access gateway 102, by delimiting the time that the concierge application 106 monitors the voice content. Likewise, limiting the responsibility of the concierge client application 122 to monitoring only for the first and second word strings may reduce the processing burden on the concierge client application 122 to a scale that is appropriate for the first portable electronic device 120. In either case, the event of the concierge application 106 receiving the first message may be referred to as a first trigger and/or a first triggering event in some contexts. Similarly, the concierge client application 122 may respond to another special code and/or code sequence input using the keypad or touch screen of the portable electronic device 120 to send the second message to the concierge application 106. The event of the concierge application 106 receiving the second message may be referred to as a second trigger and/or a second triggering event in some contexts.

When active, the concierge application 106 monitors the voice content transmitted by the first portable electronic device 120. The concierge application 106 may analyze the voice content in a digitized form, for example in a form used for conducting voice over internet protocol (VoIP) communication, or may first demodulate the voice content into an analog form and then analyze the analog form of the voice content. In either case, the concierge application 106 analyzes the voice content to determine a context of a discussion. For example, the concierge application 106 may determine that a discussion between a user of the first portable electronic device 120 and a user of the communication device 126 is directed to eating at a restaurant, going out to see a movie, purchasing tickets to a sporting event, stopping by a grocery store during a commute home from the office, traveling out of town, and other like topics. In an embodiment, the concierge application 106 monitors only the voice content transmitted by the first portable electronic device 120. In another embodiment, however, the concierge application 106 may monitor both the voice content transmitted by the first portable electronic device 120 and the voice content transmitted by the communication device 126 to determine the context of the discussion.

Based on the context of the discussion, the concierge application 106 may transmit a voice message to the first portable electronic device 120. The voice message may be a suggestion relevant to the context of the discussion, for example a suggestion to eat at a newly opened Italian restaurant conveniently located between a location associated with the first portable electronic device 120 and a location associated with the communication device 126. In some circumstances, the concierge application 106 may transmit the voice message only to the first portable electronic device 120, while in other circumstances the concierge application 106 may transmit the voice message to both the first portable electronic device 120 and the communication device 126. In an embodiment, the first portable electronic device 120 may have provided a personal profile of the user of the portable electronic device 120 to the concierge application 106. The concierge application 106 may store the profile information in the data store 104. The profile information may identify restaurant preferences, demographic information of the user, entertainment tastes, and other personal profile information. Alternatively, or in addition, the concierge application 106 may access a profile that has been built by the media access gateway 102 or other server in the wireless service provider network based on historical transactions and movements of the first portable electronic device 120. The voice message transmitted to the first portable electronic device 120 may be based in part on the personal profile associated with the first portable electronic device 120, for example indicating a moderate preference for Italian food.

The voice message may be presented as a voice message overlaid with the on-going conversation by the first portable electronic device 120. The voice message may be presented quietly and with minimal interruption to the first portable electronic device 120. The concierge application 106 may offer to arrange dinner reservations if the portable electronic device 120 wishes to confirm this option by keying in a specific code. It is contemplated that the concierge application 106 may be able to provide suitable suggestions and/or helps suitable to a variety of different contexts via a voice message transmitted to the first portable electronic device 120. The movie suggestion may be further based on the concierge application 106 searching movie show times and personal profile information associated with the user of the first portable electronic device 120 and/or a user profile associated with the user of the communication device 126 or the second portable electronic device 130.

In an embodiment, the first portable electronic device 120 transmits data reflecting a calendar of the user that is maintained on the first portable electronic device 120 to the concierge application 106 and updates the data as events are added to, removed, and/or rolled off the subject calendar. Alternatively, the calendar of the user may be maintained on a server or other device remote from the first portable electronic device 120 and the calendar data may be transmitted to the concierge application 106 or retrieved from the server by the concierge application 106. The concierge application 106 adapts suggestions and helps provided to the first portable electronic device 120 based on the context as well as based on the calendar data. For example, when the concierge application 106 determines that the context is a discussion directed to seeing a movie, the concierge application 106 may consult the current calendar data associated with the first electronic device 120, determine that the user has a major project due the following day, and transmit a voice message to the first portable electronic device 120 suggesting a movie time on the evening of the following day and offering to purchase tickets if the user acknowledges with a specific code and/or code sequence transmitted by the first portable electronic device 120.

As another example, when the concierge application 106 determines that the context is a discussion directed to meeting for lunch the following day but the calendar data indicates the user of the first portable electronic device 120 has a working lunch meeting scheduled the following day, the concierge application 106 may transmit a voice message to the first portable electronic device 120 indicating the conflict and suggesting the day after the following day as a lunch date. As the user of the first portable electronic device 120 interacts with the concierge application 106, for example confirming an offer to make a dinner reservation, the concierge application 106 updates the calendar data that is stored in the data store 104 and transmits this information back to the first portable electronic device 120 for updating the calendar data maintained in the memory of the first portable electronic device 120 or to the server maintaining the user's calendar information.

The calendar data may include birth date information linked to phone numbers, for example a phone number associated with the communication device 126. When the user of the first portable electronic device 120 places a call to his mother, for example the user of the communication device 126, on his mother's birthday, the concierge application 106 detects a match between the called phone number and the phone number associated with the birth date. The concierge application 106 correlates the current date of the call and the birth date in the calendar data and transmits a voice message stating that it is the birthday of the called party to the first portable electronic device 120. This voice message may be presented on the first portable electronic device 120 in the background of the conversation between the user of the first portable electronic device 120 and his or her mother. This functionality may be extended to provide the voice message any time a call is placed to the subject person during a time window surrounding their birth date, for example a window of two days before and after the subject birth date or a window of a week before and after the birth date. This functionality may be extended to apply to other significant dates such as anniversaries, holidays, and other dates. In this example, the voice message may be presented only to the first portable electronic device 120 to avoid the mother making the undesirable inference that the user of the first portable electronic device 120 would not otherwise remember her birthday.

When the first portable electronic device 120 is in a voice call and an appointment in the calendar data is approaching, for example a meeting scheduled to begin in five minutes, the concierge application 106 may transmit a voice message containing a reminder of the meeting to the first portable electronic device 120 which is then presented audibly by the first portable electronic device 120, for example over-laid on the voice conversation heard by the user of the first portable electronic device 120. In this example the reminder of the forthcoming meeting may be presented only to the first portable electronic device 120 and not to the other end of the voice call, to keep the information about the scheduled meeting confidential and/or to spare the person on the other end of the call unnecessary and/or confusing information. The calendar data may include information about periodic bills, and the concierge application 106 may authorize payment of the one or more of the periodic bills as configured by a user of the first portable electronic device 120.

When voicemail has been received while the first portable electronic device 120 is engaged in a call, the concierge application 106 may analyze the posted voicemail, summarize the voicemail, and transmit a voice message containing the summary of the voicemail to the first portable electronic device 120, including an indication of the caller and the subject of their voicemail which is then presented audibly by the first portable electronic device 120, for example over-laid on the voice conversation heard by the user of the first portable electronic device 120. When an email is directed to the first portable electronic device 120 while the first portable electronic device 120 is engaged in a call, the concierge application 106 may analyze the email, summarize the email, and transmit a voice message containing the summary of the email as well as an indication of who sent the email and a subject line of the email. The first portable electronic device may present the voice message audibly over-laid on the voice conversation heard by the user of the first portable electronic device 120. When a text message is directed to the first portable electronic device 120 while the first portable electronic device 120 is engaged in a call, the concierge application 106 may analyze the text message, summarize the text message, and transmit a voice message containing the summary of the text message as well as an indication of who sent the text message. The first portable electronic device 120 may present the voice message audibly over-laid on the voice conversation heard by the user of the first portable electronic device 120. In these examples, the voice messages generated by the concierge application 106 may be presented only to the first portable electronic device 120 and not to the other end of the voice call—for example to the second portable electronic device 130 or to the communication device 126—to avoid disclosing possibly confidential or sensitive information.

In an embodiment, the user of the first portable electronic device 120 may configure the concierge application 106 to present messages originating from some sources only to the first portable electronic device 120 and to present messages originating from different sources to both the first portable electronic device 120 and the other end of a voice call connected to the first portable electronic device 120, for example to the communication device 126 or the second portable electronic device 130. In some cases, the concierge application 106 may present messages using one-way insertion—insertion only into the audio stream presented on the first portable electronic device 120—or using two-way insertion—insertion into both the audio stream presented on the first portable electronic device 120 and on the other end of the voice call, for example the communication device 126 or the second portable electronic device 130—based on an identity of the other end of the voice call. In some cases, the concierge application 106 may choose between one-way insertion and two-way insertion based further on a context of the call. For example, when the context is discussing going out to see a movie, the concierge application 106 may announce a schedule conflict that precludes seeing a 5:30 PM showing to both ends of the call.

In an embodiment, the concierge application 106 may monitor and analyze information provided by subscription information services to which the first portable electronic device 120 is subscribed or to web sites of interest to the first portable electronic device 120. The subscription information services may include subscription news services, subscription stock quote services, subscription sports score reporting services, subscription traffic condition reporting services, and others. The subscription information services may provide their updates via real simple syndication (RSS) feeds or by other known information distribution mechanisms to the concierge application 106 and/or to the first portable electronic device 120. When transmission of new information is detected, the concierge application 106 may summarize the information and transmit a voice message containing the summary to the first portable electronic device 120 to be presented audibly as described above, for example as a whisper message. This information may include web sites providing current scores of sporting events, weather reports, flight status information, commuting conditions, and other information. The concierge application 106 may obtain information from a search engine, for example during the course of performing various analysis and/or providing suggestions and/or helps based on context.

In an embodiment, a user of the first portable electronic device 120 may be able to post reminders linked to phone numbers, such that when the first portable electronic device 120 calls or is called by the communication device 126 or the second portable electronic device 130 associated with the linked phone number, the concierge application 106 transmits a voice message containing the reminder to the first portable electronic device 120 to be audibly over-laid over the conversation. In an embodiment, a user of the first portable electronic device 120 may be able to enter and post a shopping list associated to a phone number of a retail store and/or grocery store. When the location of the first portable electronic device 120 approaches the location associated with the phone number associated with the shopping list, the concierge application 106 may transmit a voice message about the shopping list to the first portable electronic device 120 to be presented audibly and installing a short cut to a code sequence to trigger the concierge application 106 to transmit a voice message containing the shopping list. The association between the phone numbers and the reminders and/or shopping list may be transmitted to the concierge application 106 by the first portable electronic device 120, for example by the concierge client application 122 in a data session that the concierge client application 122 may establish with the concierge application 106, by the concierge client application 122 sending a text message to the concierge application 106, or by another communication mechanism.

In an embodiment, both the first portable electronic device 120 and the second portable electronic device 130 or the communication device 126 may be served by the concierge application 106. The two concierge applications 106—or the same concierge application 106 but concurrently serving the first portable electronic device 120 and the second portable electronic device 130 or the communication device 126, for example through two distinct instantiations of the concierge application 106 executing on the media access gateway 102 or other server computers—may cooperate to determine the context of the conversation between the first portable electronic device 120 and the communication device 126 or the second portable electronic device 130 and to share some of the information generated by the concierge application 106. For example, when the concierge application 106 updates calendar data associated with the first portable electronic device 120 that also relates to the user of the second portable electronic device 130, the concierge application 106 may likewise update the calendar data associated with the second portable electronic device 130. The concierge application 106 may be able to correlate or otherwise combine the profile information associated with both of the users of the two portable electronic devices 120, 130 to suggest a restaurant, a movie, entertainment that may be acceptable to both users.

Figure 2:
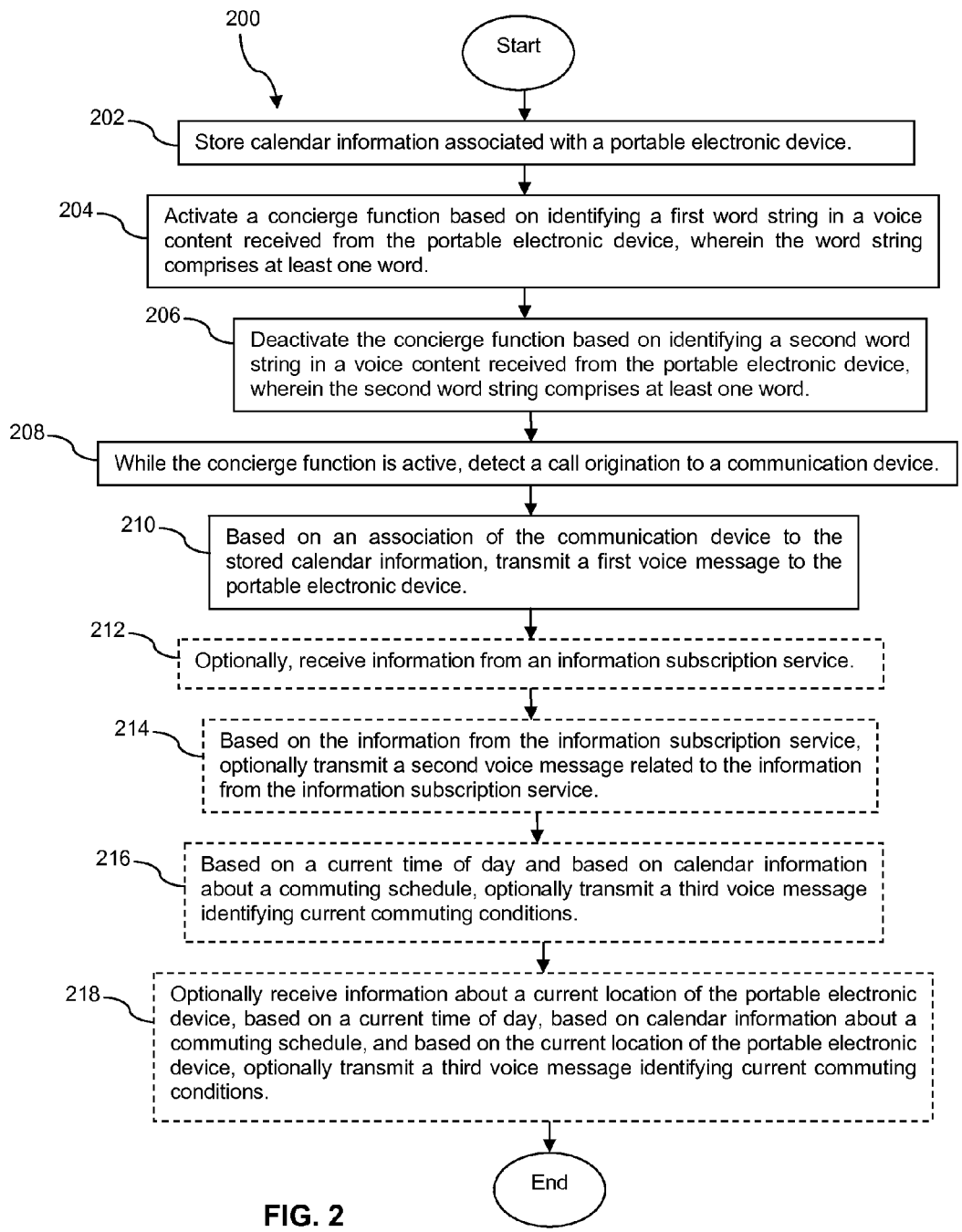
FIG. 2 is an illustration of a method according to an embodiment of the disclosure.

Turning now to FIG. 2, a method 200 is described. At block 202, calendar information associated with a portable electronic device is stored. For example, calendar information associated with the first portable electronic device 120 is transmitted to the concierge application 106 executing on the media access gateway 102, and the concierge application 106 stores and/or writes the calendar information and/or calendar data to the data store 104. The processing of block 202 may be repeated occasionally as the calendar information associated with the portable electronic device is updated and/or as events roll-off the calendar of the portable electronic device.

At block 204, a concierge function activates based on identifying a first word string in a voice content received from the portable electronic device, wherein the word string comprises at least one word. For example, the concierge application 106 activates based on detecting the first word string in voice content received from the first portable electronic device 120. The first word string may be less than 20 words, less than 10 words, or less than 5 words. At block 206, the concierge function deactivates based on identifying a second word string in a voice content received from the first portable electronic device 120, wherein the second word string comprises at least one word. For example, the concierge application 106 deactivates based on detecting the second word string in a voice content received from the first portable electronic device 120. The second word string may be less than 20 words, less than 10 words, or less than 5 words.

At block 208, while the concierge function is active, a call origination to a communication device is identified and/or detected. At block 210, based on an association of the communication device to the stored calendar information, a first voice message is transmitted to the portable electronic device. For example the concierge application 106 transmits the first voice message to the first portable electronic device 120 indicating that today is the birthday of the user associated with the communication device 126 or the second portable electronic device 130. The first portable electronic device 120 may present the first voice message as a whisper message in the background of the in-progress call.

At block 212, information is optionally received from an information subscription service. At block 214, based on the information from the information subscription service, a second voice message related to the information from the information subscription service optionally is transmitted. For example, the concierge application 106 receives information from an information subscription service such as a stock quotes and transmits the second voice message the first portable electronic device 120. The first portable electronic device 120 may present the second voice message as a whisper message in the background of an on-going phone call.

At block 216, based on a current time of day and based on calendar information about a commuting schedule, a third voice message is transmitted. For example, the concierge application 106 transmits the third voice message to the first portable electronic device 120. The third voice message may contain information about current traffic conditions and/or current commuter train delays. The first portable electronic device 120 may present the third voice message about commuting conditions as a whisper message on the first portable electronic device 120.

At block 218, information about a current location of the portable electronic device optionally is received, and based on a current time of day, based on calendar information about a commuting schedule, and based on the current location of the portable electronic device, a fourth voice message optionally is transmitted. For example, the first portable electronic device 120 transmits information about its current location to the concierge application 106, and based on the current time of day, based on calendar information about a commuting schedule, and based on the current location of the first portable electronic device 120, the concierge application 106 transmits the fourth voice message to the first portable electronic device 120. The fourth voice message may contain information about commuting conditions further based on the current location of the first portable electronic device 120.

Figure 3:
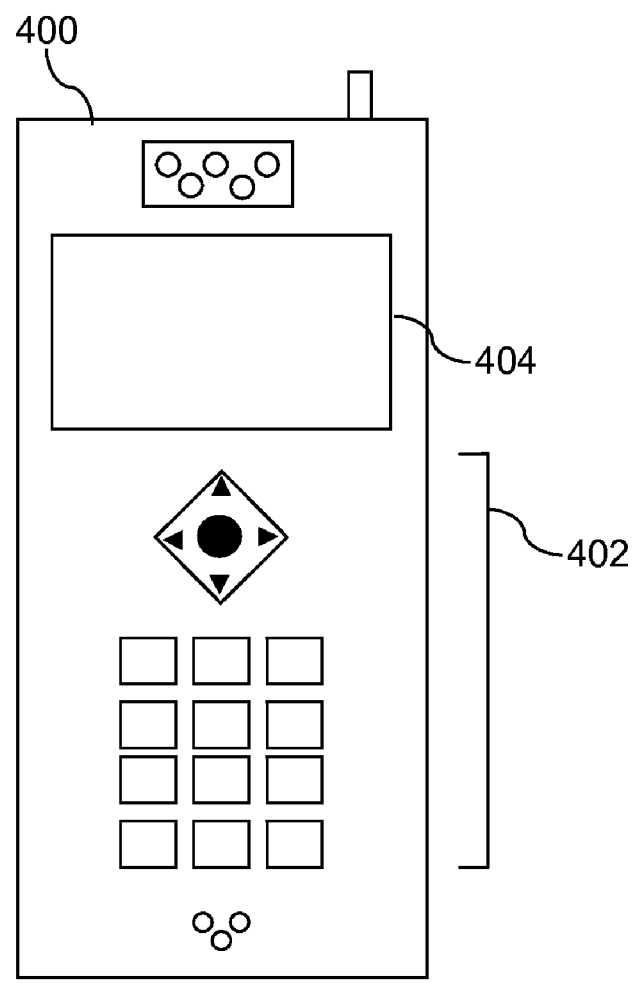
FIG. 3 is an illustration of a handset according to an embodiment of the disclosure.

FIG. 3 depicts a handset 400, which is operable for implementing aspects of the present disclosure, but the present disclosure should not be limited to these implementations. For example, some embodiments of the portable electronic devices 120, 130 may be implemented in a form similar to the handset 400. The handset 400 includes a display 404 and a touch-sensitive surface and/or keys 402 for input by a user. The handset 400 may present options for the user to select, controls for the user to actuate, and/or cursors or other indicators for the user to direct. The handset 400 may further accept data entry from the user, including numbers to dial or various parameter values for configuring the operation of the handset. The handset 400 may further execute one or more software or firmware applications in response to user commands. These applications may configure the handset 400 to perform various customized functions in response to user interaction. Additionally, the handset 400 may be programmed and/or configured over-the-air, for example from a wireless base station, a wireless access point, or a peer handset 400. The handset 400 may execute a web browser application which enables the display 404 to show a web page. The web page may be obtained via wireless communications with a base transceiver station 124, 134, a wireless network access node, a portable electronic device 120, 130, or any other wireless communication network or system.

Figure 4:
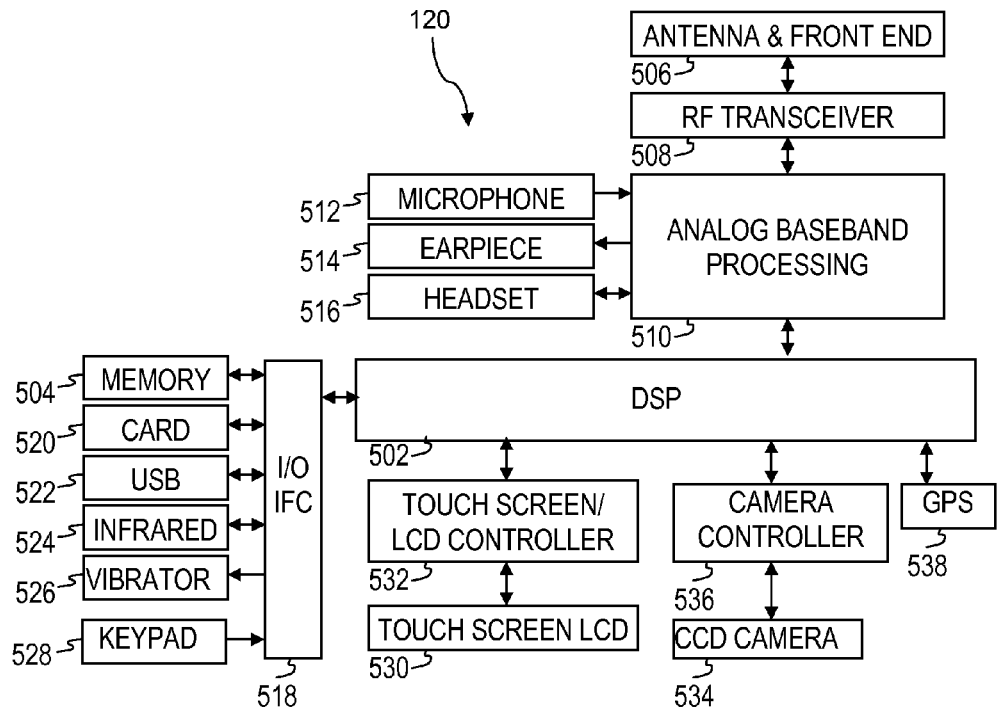
FIG. 4 is a block diagram of a portable electronic device according to an embodiment of the disclosure.

FIG. 4 shows a block diagram of the portable electronic device 120. While a variety of known components of portable electronic devices are depicted, in an embodiment a subset of the listed components and/or additional components not listed may be included in the portable electronic device 120. The portable electronic device 120 includes a digital signal processor (DSP) 502 and a memory 504. As shown, the portable electronic device 120 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the portable electronic device 120 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the portable electronic device 120 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the portable electronic device 120 to send and receive information from a radio access network (RAN) or some other available wireless communications network or from a peer portable electronic device 120. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 508, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the portable electronic device 120 to be used as a mobile phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the portable electronic device 120 to function as a peripheral device to exchange information with a personal computer or other computer system. The infrared port 524 and other optional ports such as a Bluetooth interface or an IEEE 802.11 compliant wireless interface may enable the portable electronic device 120 to communicate wirelessly with other nearby handsets and/or wireless base stations.

The input/output interface 518 may further connect the DSP 502 to the vibrator 526 that, when triggered, causes the portable electronic device 120 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the portable electronic device 120. Another input mechanism may be the touch screen LCD 530, which may also display text and/or graphics to the user. The touch screen LCD controller 532 couples the DSP 502 to the touch screen LCD 530.

The CCD camera 534 enables the portable electronic device 120 to take digital pictures. The DSP 502 communicates with the CCD camera 534 via the camera controller 536.

The GPS sensor 538 is coupled to the DSP 502 to decode global positioning system signals, thereby enabling the portable electronic device 120 to determine its position. In another embodiment, a camera operating according to a technology other than charge coupled device cameras may be employed. Various other peripherals may also be included to provide additional functions, e.g., radio and television reception.

Figure 5:
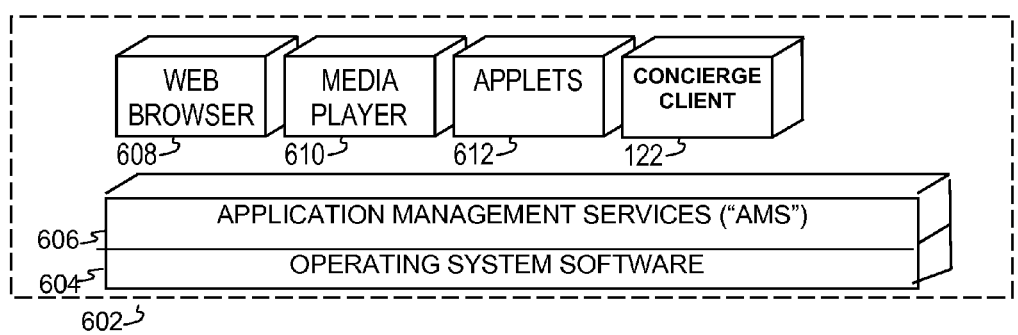
FIG. 5 is a block diagram of a software architecture of a portable electronic device according to an embodiment of the disclosure.

FIG. 5 illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services ("AMS") 606 that transfer control between applications running on the portable electronic device 120. Also shown in FIG. 5 are a web browser application 608, a media player application 610, JAVA applets 612, and optionally the concierge client application 122. The web browser application 608 configures the portable electronic device 120 to operate as a web browser, allowing a user to enter information into forms and select links to retrieve and view web pages. The media player application 610 configures the portable electronic device 120 to retrieve and play audio or audiovisual media. The JAVA applets 612 configure the portable electronic device 120 to provide games, utilities, and other functionality. The concierge client application 122 is discussed above.

Figure 6:
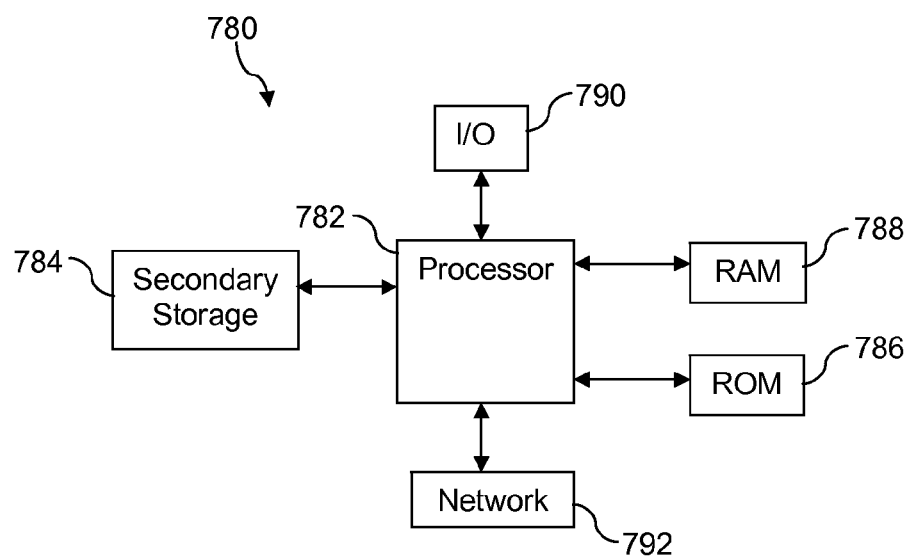
FIG. 6 is a block diagram of an exemplary computer system suitable for implementing some aspects of the several embodiments of the disclosure.

FIG. 6 illustrates a computer system 780 suitable for implementing one or more embodiments disclosed herein, for example the media access gateway 102 and/or a server computer. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

It is understood that by programming and/or loading executable instructions onto the computer system 780, at least one of the CPU 782, the RAM 788, and the ROM 786 are changed, transforming the computer system 780 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 792 may enable the processor 782 to communicate with an Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embodied in the carrier wave generated by the network connectivity devices 792 may propagate in or on the surface of electrical conductors, in coaxial cables, in waveguides, in an optical conduit, for example an optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors.

In an embodiment, the computer system 780 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 780 to provide the functionality of a number of servers that is not directly bound to the number of computers in the computer system 780. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein implementing the functionality disclosed above. The computer program product may comprise data, data structures, files, executable instructions, and other information. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 780, at least portions of the contents of the computer program product to the secondary storage 784, to the ROM 786, to the RAM 788, and/or to other non-volatile memory and volatile memory of the computer system 780. The processor 782 may process the executable instructions and/or data in part by directly accessing the computer program product, for example by reading from a CD-ROM disk inserted into a disk drive peripheral of the computer system 780. The computer program product may comprise instructions that promote the loading and/or copying of data, data structures, files, and/or executable instructions to the secondary storage 784, to the ROM 786, to the RAM 788, and/or to other non-volatile memory and volatile memory of the computer system 780.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of generating a message based on an association of a communication device to stored calendar information, the method comprising:
   storing calendar information associated with a portable electronic device, wherein the calendar information comprises a significant date of a user associated with a communication device;
   activating a concierge function based on identifying a first word string in a voice content received from the portable electronic device, wherein the word string comprises at least one word;
      detecting a call origination to the communication device while the concierge function is active;
   determining an association of the communication device to the stored calendar information;
   identifying the significant date of the user associated with the communication device based on the association;
   comparing whether the significant date falls within a time window of the current date that is before or after the current date;
   generating a first voice message about the identification of the significant date when the significant date falls within the time window of the current date that is before or after the current date;
   transmitting the first voice message to the portable electronic device;
   while the concierge function is active, analyzing both voice content transmitted by the portable electronic device and voice content transmitted by the communication device during a voice call between the portable electronic device and the communication device to identify a context;
   receiving profile information associated with the portable electronic device, wherein the profile information comprises at least one of restaurant preferences, demographic information, and entertainment tastes;
   analyzing the context and the profile information;
   generating a second voice message based on analyzing the context and the profile information and transmitting the second voice message to the portable electronic device based on the context and the profile information, wherein the second voice message comprises one of a recommendation of entertainment, a restaurant, a traffic report, a sports report, and a flight status; and
   deactivating the concierge function based on identifying a second word string in a voice content received from the portable electronic device, wherein the second word string comprises at least one word.

2. The method of claim 1, wherein the first voice message comprises an indication of a birth date of a user associated with the communication device.

3. The method of claim 2, wherein transmitting the first voice message to the portable electronic device is based further on a correlation of a current date when the call origination occurs and the birth date.

4. The method of claim 1, further comprising:
   receiving information from an information subscription service; and
   based on the information from the information subscription service, transmitting a third voice message related to the information from the information subscription service.

5. The method of claim 1, further comprising, based on a current time of day and based on calendar information about a commuting schedule, transmitting a third voice message identifying current commuting conditions.

6. The method of claim 5, further comprising receiving information about a current location of the portable electronic device, wherein sending the third voice message identifying current commuting conditions is further based on the current location of the portable electronic device.

* * * * *